UNITED STATES PATENT OFFICE.

ROBERT EDGAR HASTINGS, OF PHILADELPHIA, PENNSYLVANIA.

IMPROVEMENT IN THE MANUFACTURE OF GOLD-LEAF FOR BOOK-BINDERS' USE.

Specification forming part of Letters Patent No. 146,001, dated December 30, 1873; application filed November 25, 1873.

*To all whom it may concern:*

Be it known that I, ROBERT EDGAR HASTINGS, of the city and county of Philadelphia, in the State of Pennsylvania, have invented a new and useful Improvement in the Manufacture of Gold-Leaf for Book-Binders' Use; and I do hereby declare the following to be a full, clear, and exact description thereof, which will enable others skilled in the art to which it appertains to make and use the said improvement.

My invention relates directly to the art of gold-leaf making; and I claim, by a simple process, to manufacture an equally dark-colored leaf at least five per cent. cheaper than it can now be made.

Gold-leaf has hitherto been made by rolling gold or its alloys direct into the required size of ribbons. Now, my improvement is as follows: I first take gold of the purity of nine hundred and ninety-one thousandths, ($\frac{991}{1000}$,)—but I do not limit myself to this exact degree—and roll into a plate of about eight inches long by one inch wide, and one-eighth ($\frac{1}{8}$) of an inch thick. Then I take a plate of silver of one-half the length of the above, the other dimensions being the same, and bend or double over the gold-plate around the silver, so as to completely cover the latter. I then hammer them together upon an anvil. Then I place this triple plate in a furnace, and heat until a welding temperature is obtained, when it is again hammered until the welding is perfected, when it is passed through rolls and flattened out, as in the common method, into a ribbon of the desired dimensions.

I do not confine myself to this method alone, but propose to unite the plates by the interposition of solder in sheets, stripes, or as most convenient, in which case plates are exposed in the furnace to a heat sufficient to melt the solder, after which the plates are rolled into the ribbons, as aforementioned.

In the plates themselves I propose to use either pure gold or its alloys for the outer plates, and pure silver or its alloys for the inner.

Having thus fully described my invention, what I claim, and desire to secure by Letters Patent of the United States, is—

The manufacture of gold-leaf for book-binders' use from ribbons composed of an interior metal of silver or its alloys with copper, and an exterior metal of gold or its alloys with silver or copper, the whole united together by welding or solder.

ROBT. EDGAR HASTINGS.

Witnesses:
J. BONSALL TAYLOR,
CHAS. E. HENRY.